US012248546B2

(12) United States Patent
Lee

(10) Patent No.: US 12,248,546 B2
(45) Date of Patent: Mar. 11, 2025

(54) ELECTRONIC DEVICE COMPRISING BIOMETRIC AUTHENTICATION DEVICE, AND METHOD FOR OPERATING SAME

(71) Applicant: SAMSUNG ELECTRONICS CO., LTD., Suwon-si (KR)

(72) Inventor: Seonho Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 122 days.

(21) Appl. No.: 17/975,252

(22) Filed: Oct. 27, 2022

(65) Prior Publication Data

US 2023/0065478 A1    Mar. 2, 2023

Related U.S. Application Data

(63) Continuation of application No. PCT/KR2021/005301, filed on Apr. 27, 2021.

(30) Foreign Application Priority Data

Apr. 27, 2020   (KR) ........................ 10-2020-0050702

(51) Int. Cl.
*G06F 21/32*   (2013.01)
(52) U.S. Cl.
CPC .................................. *G06F 21/32* (2013.01)
(58) Field of Classification Search
CPC ....................................................... G06F 21/32
See application file for complete search history.

(56) References Cited

U.S. PATENT DOCUMENTS

| 7,120,278 B2 | 10/2006 | Sukegawa et al. |
| 7,454,041 B2 | 11/2008 | Sukegawa et al. |
| 8,489,890 B2 | 7/2013  | Darbha et al.   |

(Continued)

FOREIGN PATENT DOCUMENTS

| EP | 3 428 818 A1       | 1/2019 |
| KR | 10-2003-0017436 A  | 3/2003 |

(Continued)

OTHER PUBLICATIONS

International Search Report dated Aug. 23, 2021 issued by the International Searching Authority in counterpart International Application No. PCT/KR2021/005301 (PCT/ISA/210).

(Continued)

*Primary Examiner* — Stephen T Gundry
(74) *Attorney, Agent, or Firm* — Sughrue Mion, PLLC

(57) ABSTRACT

An electronic device includes a biometric authentication device; a memory configured to store an application and one or more instructions; and at least one processor configured to execute the one or more instructions to: receive an input for executing the application; based on receiving the input for executing the application, begin launching the application by loading public content corresponding to the application; operate the biometric authentication device to perform a biometric authentication while the public content is loaded; and based on the biometric authentication device completing the biometric authentication, complete the launching of the application by loading the public content and dedicated content associated with the biometric authentication.

18 Claims, 7 Drawing Sheets

(56) References Cited

U.S. PATENT DOCUMENTS

| | | | |
|---|---|---|---|
| 8,713,706 B2 | 4/2014 | Barker et al. | |
| 9,262,003 B2 | 2/2016 | Kitchens et al. | |
| 9,503,894 B2 | 11/2016 | Shanmugam et al. | |
| 9,626,505 B2 | 4/2017 | Kim et al. | |
| 10,515,365 B2 | 12/2019 | Trelin | |
| 10,534,903 B2 | 1/2020 | Trelin | |
| 10,536,857 B1 | 1/2020 | Sloane et al. | |
| 10,779,165 B1 | 9/2020 | Sloane et al. | |
| 10,939,265 B2 | 3/2021 | Fokle et al. | |
| 11,632,366 B1* | 4/2023 | Shemesh | H04L 67/1004 |
| | | | 726/3 |
| 12,032,990 B2* | 7/2024 | Cha | G06F 9/48 |
| 2006/0026689 A1 | 2/2006 | Barker et al. | |
| 2006/0123056 A1 | 6/2006 | Darbha et al. | |
| 2008/0059805 A1 | 3/2008 | Yoshioka et al. | |
| 2010/0293606 A1* | 11/2010 | Darbha | H04N 21/422 |
| | | | 726/5 |
| 2015/0123931 A1 | 5/2015 | Kitchens et al. | |
| 2015/0180865 A1 | 6/2015 | Wong et al. | |
| 2015/0257004 A1 | 9/2015 | Shanmugam et al. | |
| 2015/0288688 A1* | 10/2015 | Derakhshani | H04M 1/673 |
| | | | 726/19 |
| 2015/0294108 A1* | 10/2015 | Kim | G06F 21/32 |
| | | | 726/18 |
| 2018/0067755 A1* | 3/2018 | Rhee | G06F 21/629 |
| 2018/0314810 A1 | 11/2018 | Fokle et al. | |
| 2019/0130089 A1 | 5/2019 | Trelin | |
| 2019/0370583 A1* | 12/2019 | Van Os | H04L 63/0861 |
| 2020/0167450 A1 | 5/2020 | Li | |
| 2020/0234027 A1* | 7/2020 | Han | G06V 40/1353 |
| 2021/0064728 A1* | 3/2021 | Kadambala | G06F 3/04842 |
| 2022/0414674 A1* | 12/2022 | Indermaur | G06Q 20/40145 |
| 2023/0021413 A1* | 1/2023 | Liu | G06Q 20/3223 |
| 2023/0023664 A1* | 1/2023 | Fernandez-Spadaro | |
| | | | H04L 63/0861 |
| 2023/0026684 A1* | 1/2023 | Lee | H04L 63/0861 |
| 2023/0147815 A1* | 5/2023 | Cho | H04L 63/123 |
| | | | 713/168 |
| 2023/0188521 A1* | 6/2023 | Szafranski | G06F 21/32 |
| | | | 713/186 |
| 2023/0259598 A1* | 8/2023 | Arroyo | G06F 21/36 |
| 2023/0316279 A1* | 10/2023 | Giobbi | G06Q 20/409 |
| | | | 713/168 |
| 2023/0325538 A1* | 10/2023 | An | G06F 21/32 |
| | | | 713/186 |
| 2023/0403160 A1* | 12/2023 | Blackhurst | H04L 9/008 |
| 2024/0184869 A1* | 6/2024 | Van Os | G06F 21/316 |

FOREIGN PATENT DOCUMENTS

| | | |
|---|---|---|
| KR | 10-2008-0022524 A | 3/2008 |
| KR | 10-2014-0035758 A | 3/2014 |
| KR | 10-2015-0042648 A | 4/2015 |
| KR | 10-2015-0068891 A | 6/2015 |
| KR | 10-2015-0117543 A | 10/2015 |
| KR | 10-2016-0083032 A | 7/2016 |

OTHER PUBLICATIONS

International Written Opinion dated Aug. 23, 2021 issued by the International Searching Authority in counterpart International Application No. PCT/KR2021/005301 (PCT/ISA/237).

Communication dated Jan. 8, 2025, issued by the Korean Intellectual Property Office in Korean Application No. 10-2020-0050702.

* cited by examiner

ELECTRONIC DEVICE COMPRISING BIOMETRIC AUTHENTICATION DEVICE, AND METHOD FOR OPERATING SAME

CROSS-REFERENCE TO RELATED APPLICATIONS

This application is a continuation application of International Application No. PCT/KR2021/005301, filed on Apr. 27, 2021, which is based on and claims priority to Korean Patent Application No. 10-2020-0050702, filed on Apr. 27, 2020, in the Korean Intellectual Property Office, the disclosures of which are incorporated by reference herein in their entireties.

BACKGROUND

1. Field

The disclosure relates to an electronic device including a biometric authentication device and an operation method thereof.

2. Description of Related Art

An electronic device may use a biometric authentication function as an authentication means. A user interface (UI) which guides a user to perform biometric authentication with respect to one of various biometric authentication means when the user consents to the biometric authentication. The user may perform biometric authentication by means of hardware sensors such as a camera for face recognition, a camera for iris recognition, and a sensor for fingerprint recognition.

An application may use a manner which loads data common to all users when launched and displays something like a meaningless logo screen to make the application appear to be running while loaded.

The application may display a log-in screen for authentication of the user after being launched and may display a UI for biometric authentication when the user selects biometric authentication. The user may perform biometric authentication. When the biometric authentication is successful, data for the authenticated user may be loaded and provided. Thereafter, when the application is run using an operation requiring authentication such as payment, the above-mentioned flow may be repeated.

For example, the user should pass through a plurality of authentication guidance UIs until receiving data for the user after running the application to log in. This may cause inconvenience to the user who repeatedly uses the application. As another example, when the application is run using an operation requiring authentication, for example, payment in the application although he or she logs in to the application, this may cause inconvenience of having to perform authentication once again and it may be accompanied by unnecessary network payload consumption due to an iterative authentication server request or the like.

SUMMARY

Provided are an apparatus for reducing time consumption which occurs in an authentication process and providing a biometric authentication function for resolving iterative authentication performance in an application which is authenticated once and an operation method thereof.

According to an aspect of the disclosure, an electronic device includes: a biometric authentication device; a memory configured to store an application and one or more instructions; and at least one processor configured to execute the one or more instructions to: receive an input for executing the application; based on receiving the input for executing the application, begin launching the application by loading public content corresponding to the application; operate the biometric authentication device to perform a biometric authentication while the public content is loaded; and based on the biometric authentication device completing the biometric authentication, complete the launching of the application by loading the public content and dedicated content associated with the biometric authentication.

The at least one processor may be further configured to execute the one or more instructions to: based on the biometric authentication device completing the biometric authentication, store information about the biometric authentication in the memory; and based on receiving a user input for executing an operation requiring authentication while the application is running, identify whether reuse of the information about the biometric authentication is allowed.

The at least one processor may be further configured to execute the one or more instructions to, based on identifying that the reuse of the information about the biometric authentication is allowed, complete the authentication of the operation without a user input for authentication.

Information about the biometric authentication includes information about whether reuse of the information about the biometric authentication is allowed.

The at least one processor may be further configured to execute the one or more instructions to identify whether the reuse of the information about the biometric authentication is allowed, based on at least one of a type of the completed biometric authentication, a type of the application, a type of data used in the application, and a frequency at which authentication is performed while the application is running.

The biometric authentication device includes at least one of a camera for face recognition, a camera for iris recognition, a sensor for fingerprint recognition, a sensor for blood vessel recognition, and a microphone for speech recognition.

The memory may be further configured to store an authentication manager program, and the at least one processor may be further configured to execute the one or more instructions to: based on receiving the input for executing the application, identify whether the application is registered with the authentication manager program; based on identifying that the application is registered with the authentication manager program, operate the biometric authentication device while loading the public content; determine a biometric authentication method based on a biometric authentication history of a user associated with the application; and operate the biometric authentication device based on the determined biometric authentication method.

The at least one processor may be further configured to execute the one or more instructions to control the biometric authentication device to perform a scan while the application is launched, without providing a user interface.

The at least one processor may be further configured to execute the one or more instructions to: determine that information about the biometric authentication is discarded based on a predetermined time elapsing after the launching of the application is completed, and the predetermined time corresponds to an average execution time of the application.

The at least one processor may be further configured to execute the one or more instructions to determine that information about the biometric authentication is discarded, based on the at least one processor switching to another application more than a predetermined number of times after the launching of the application is completed, or based on the electronic device entering a locked state.

According to an aspect of the disclosure, a method for providing a biometric authentication function in an electronic device including a biometric authentication device, includes: receiving an input for executing an application included in the electronic device; based on receiving the input for executing the application, beginning a launching the application by loading public content corresponding to the application; operating the biometric authentication device of the electronic device to perform a biometric authentication while the public content of the application is loaded; and based on the biometric authentication device completing the biometric authentication, completing the launching of the application by loading the public content and dedicated content associated with the biometric authentication.

The method may further include: based on the biometric authentication device completing the biometric authentication, storing information about the biometric authentication in a memory of the electronic device; and based on receiving a user input for executing an operation requiring authentication while the application is running, identifying whether to reuse the information about the biometric authentication.

The method may further include, based on identifying that the reuse of the information about the biometric authentication is allowed, completing the authentication of the operation without a user input for authentication.

Information about the biometric authentication includes information about whether reuse of the information about the biometric authentication is allowed.

The method may further include identifying whether the reuse of the information about the biometric authentication is allowed, based on at least one of a type of the completed biometric authentication, a type of the application, a type of data used in the application, and a frequency at which authentication is performed while the application is running.

According to various embodiments disclosed in the disclosure, the electronic device may perform biometric authentication using a waiting time which occurs in an application launching (loading) operation, thus preventing iterative application data loading to shorten an application usage time and time consumption for authentication and shorten a time for displaying a UI for authentication.

According to various embodiments disclosed in the disclosure, the electronic device may selectively or primarily operate hardware for biometric authentication that the user has performed or biometric authentication frequently used by the user, in the application launching (loading) operation, thus shortening time consumption and power consumption for authentication.

According to various embodiments disclosed in the disclosure, the electronic device may store biometric authentication information in the application launching (loading) operation and may conditionally reuse the stored biometric authentication information when authentication is requested while the application is running, thus not affecting another application while reducing a fatigue level due to iterative authentication to maintain security depending on the selection of the user.

According to various embodiments disclosed in the disclosure, the electronic device may classify and store the reuse of biometric authentication information as being allowed or being not allowed with regard to a security level of a biometric authentication type and a security level necessary for data used in the application, when storing biometric authentication in the application launching (loading) operation, thus maintaining security while reducing a fatigue level due to iterative authentication.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Hereinafter, various embodiments of the disclosure will be described with reference to accompanying drawings. However, it should be understood that this is not intended to limit the disclosure to specific implementation forms and includes various modifications, equivalents, and/or alternatives of embodiments of the disclosure. With regard to description of drawings, the same or similar denotations may be used for the same or similar components.

Hereinafter, a configuration of an electronic device according to an embodiment will be described with reference to FIG. 1.

Figure 1:
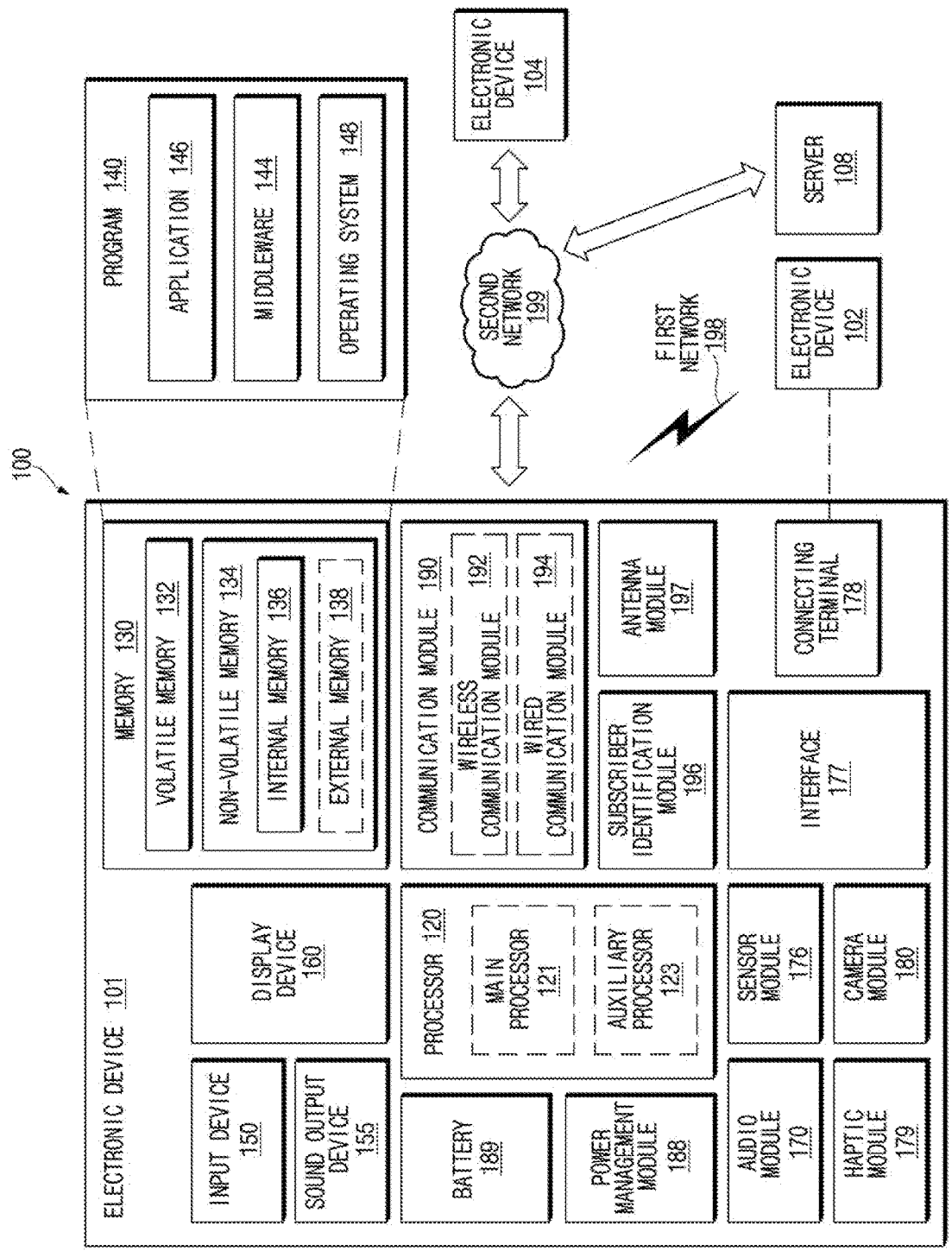
FIG. 1 is a block diagram illustrating an electronic device in a network environment according to an embodiment.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module(SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 148, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming call. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
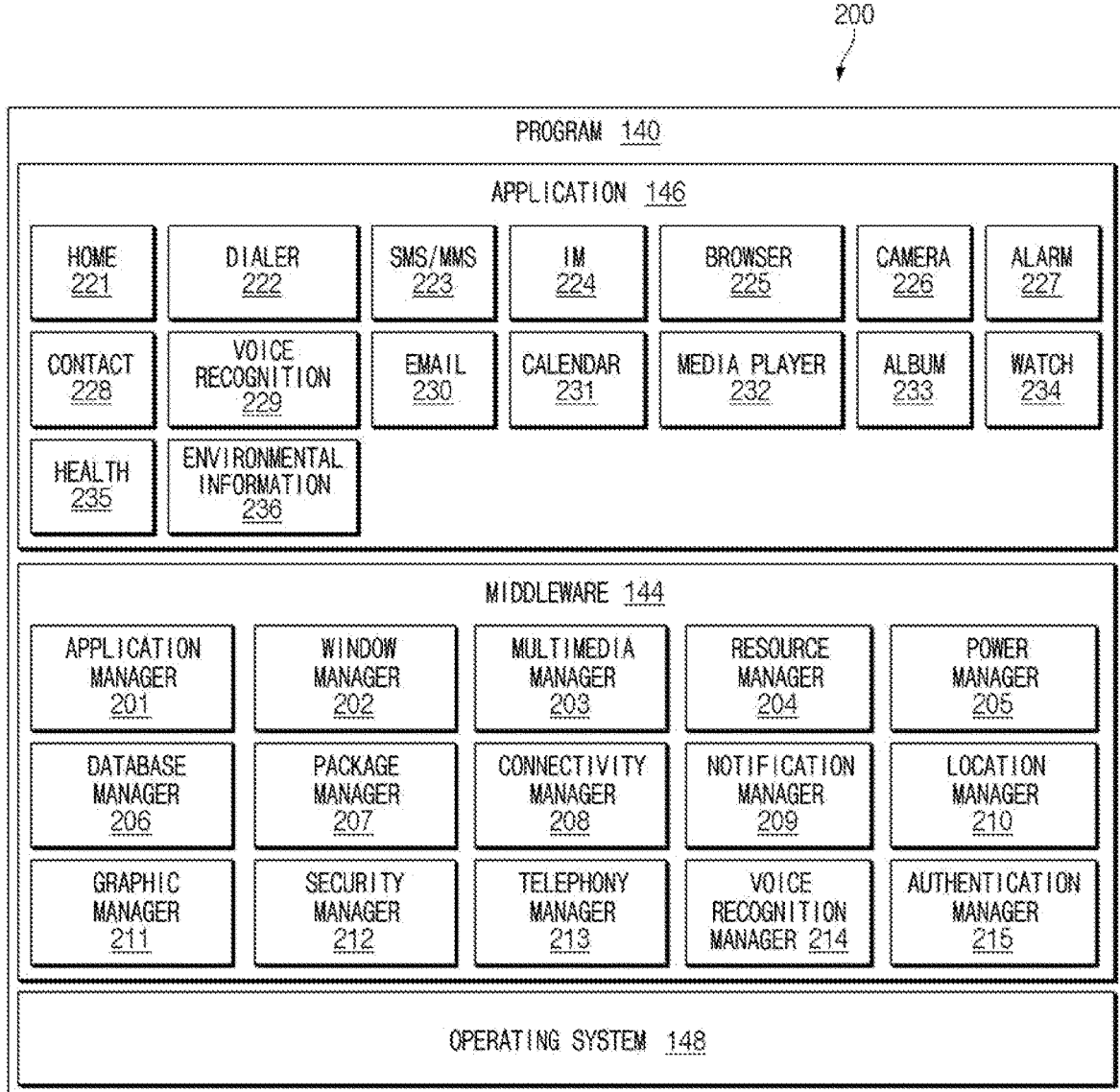
FIG. 2 is a block diagram 200 illustrating a program according to an embodiment.

FIG. 2 is a block diagram 200 illustrating the program 140 according to various embodiments. According to an embodiment, the program 140 may include an operating system (OS) 148 to control one or more resources of the electronic device 101, middleware 144, or an application 146 executable in the OS 148. The OS 148 may include, for example, Android™, iOS™, Windows™, Symbian™, Tizen™, or Bada™. At least part of the program 140, for example, may be pre-loaded on the electronic device 101 during manufacture, or may be downloaded from or updated by an external electronic device (e.g., the electronic device 102 or 104, or the server 108) during use by a user.

The OS 148 may control management (e.g., allocating or deallocation) of one or more system resources (e.g., process, memory, or power source) of the electronic device 101. The OS 148, additionally or alternatively, may include one or more driver programs to drive other hardware devices of the electronic device 101, for example, the input module 150, the sound output module 155, the display module 160, the audio module 170, the sensor module 176, the interface 177, the haptic module 179, the camera module 180, the power management module 188, the battery 189, the communication module 190, the subscriber identification module 196, or the antenna module 197.

The middleware 144 may provide various functions to the application 146 such that a function or information provided from one or more resources of the electronic device 101 may be used by the application 146. The middleware 144 may include, for example, an application manager 201, a window manager 202, a multimedia manager 203, a resource manager 204, a power manager 205, a database manager 206, a package manager 207, a connectivity manager 208, a notification manager 209, a location manager 210, a graphic manager 211, a security manager 212, a telephony manager 213, a voice recognition manager 214 or an authentication manager 215.

The application manager 201, for example, may manage the life cycle of the application 146. The window manager 202, for example, may manage one or more graphical user interface (GUI) resources that are used on a screen. The multimedia manager 203, for example, may identify one or more formats to be used to play media files, and may encode or decode a corresponding one of the media files using a codec appropriate for a corresponding format selected from the one or more formats. The resource manager 204, for example, may manage the source code of the application 146 or a memory space of the memory 130. The power manager 205, for example, may manage the capacity, temperature, or power of the battery 189, and determine or provide related information to be used for the operation of the electronic device 101 based at least in part on corresponding information of the capacity, temperature, or power of the battery 189. According to an embodiment, the power manager 209 may interwork with a basic input/output system (BIOS) (not shown) of the electronic device 101.

The database manager 206, for example, may generate, search, or change a database to be used by the application 146. The package manager 207, for example, may manage installation or update of an application that is distributed in the form of a package file. The connectivity manager 208, for example, may manage a wireless connection or a direct connection between the electronic device 101 and the external electronic device. The notification manager 209, for example, may provide a function to notify a user of an occurrence of a specified event (e.g., an incoming call, message, or alert). The location manager 210, for example, may manage locational information on the electronic device 101. The graphic manager 211, for example, may manage one or more graphic effects to be offered to a user or a user interface related to the one or more graphic effects.

The security manager 212, for example, may provide system security or user authentication. The telephony manager 213, for example, may manage a voice call function or a video call function provided by the electronic device 101. The voice recognition manager 214, for example, may transmit a user's voice data to the server 108, and receive, from the server 108, a command corresponding to a function to be executed on the electronic device 101 based at least in part on the voice data, or text data converted based at least in part on the voice data. The authentication manager 215 may provide, for example, user authentication for an application. According to an embodiment, in response to receiving that an application execution input has occurred, the authentication manager 215 may identify whether the corresponding application is registered in the authentication manager 215. According to an embodiment, the middleware 244 may dynamically delete some existing components or add new components. According to an embodiment, at least part of the middleware 144 may be included as part of the OS 148 or may be implemented as another software separate from the OS 148.

The application 146 may include, for example, a home 221, dialer 222, short message service (SMS)/multimedia messaging service (MMS) 223, instant message (IM) 224, browser 225, camera 226, alarm 227, contact 228, voice recognition 229, email 230, calendar 231, media player 232, album 233, watch 234, health 235 (e.g., for measuring the degree of workout or biometric information, such as blood sugar), or environmental information 236 (e.g., for measuring air pressure, humidity, or temperature information) application. According to an embodiment, the application 146 may further include an information exchanging application (not shown) that is capable of supporting information exchange between the electronic device 101 and the external electronic device. The information exchange application, for example, may include a notification relay application adapted to transfer designated information (e.g., a call, message, or alert) to the external electronic device or a device management application adapted to manage the external electronic device. The notification relay application may transfer notification information corresponding to an occurrence of a specified event (e.g., receipt of an email) at another application (e.g., the email application 230) of the electronic device 101 to the external electronic device. Additionally or alternatively, the notification relay application may receive notification information from the external electronic device and provide the notification information to a user of the electronic device 101.

The device management application may control the power (e.g., turn-on or turn-off) or the function (e.g., adjustment of brightness, resolution, or focus) of the external electronic device or some component thereof (e.g., a display device 160 or a camera module 180 of the external electronic device). The device management application, additionally or alternatively, may support installation, delete, or update of an application running on the external electronic device.

Hereinafter, an operation of an electronic device according to an embodiment will be described with reference to FIG. 3.

Figure 3:
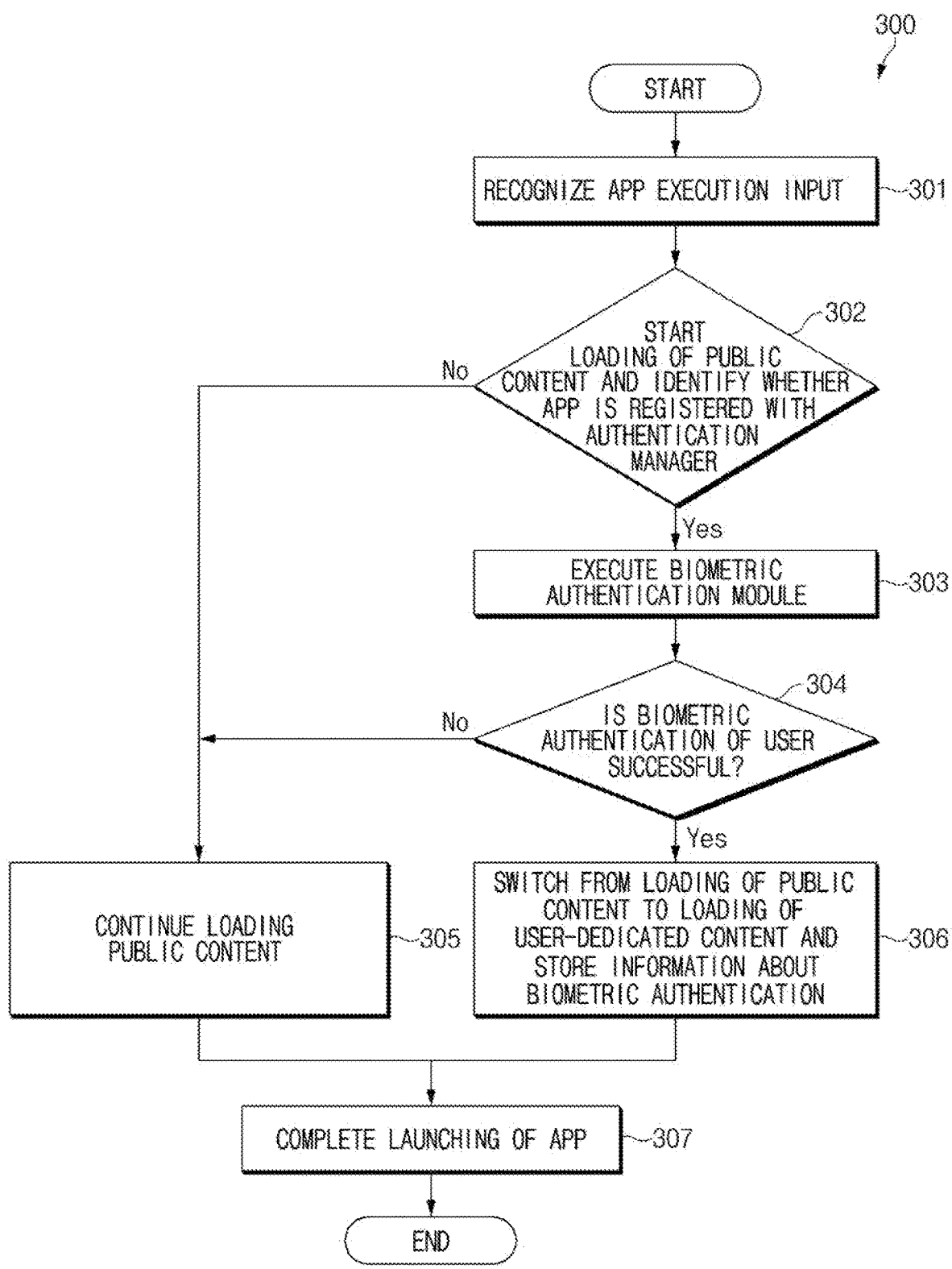
FIG. 3 is a flowchart illustrating an operation of an electronic device according to an embodiment.

FIG. 3 is a flowchart 300 illustrating an operation of an electronic device according to an embodiment. The operation of the electronic device described below may be performed by a processor (e.g., a processor 120 of FIG. 1) of an electronic device (e.g., an electronic device 101 of FIG. 1).

Referring to FIG. 3, in operation 301, the processor (e.g., the processor 120 of FIG. 1) of the electronic device (e.g., the electronic device 101 of FIG. 1) may recognize an input for executing an application (e.g., an application 146 of FIG. 1) stored in a memory (e.g., a memory 130 of FIG. 1) of the electronic device. In embodiments, the application may be referred to as an app. According to an embodiment, the input for executing the application may be an input for touching an icon of the application such that a user runs the application.

In operation 302, the processor of the electronic device may start to load public content of the application depending as the user recognizes the application execution input and may identify whether the corresponding application is an application registered with an authentication manager 215. According an embodiment, the public content of the application may include content provided publicly to users of all applications before user authentication is completed. According an embodiment, upon the operation of loading the public content of the application, the processor of the electronic device may identify whether the corresponding application is an application registered with the authentication manager 215. According an embodiment, the processor of the electronic device may perform the other preparation for launching the application other than loading the public content of the application.

According to an embodiment, the authentication manager 215 may be included in an operating system frame work. According to an embodiment, the processor of the electronic device may deliver that the application execution input occurs to the authentication manager 215, and the authentication manager 215 may identify whether the corresponding application is an application registered with the authentication manager 215 as it is received that the application execution input occurs. According an embodiment, as it is recognized that the application execution input occurs, the processor of the electronic device may identify whether the corresponding application is an application registered with the authentication manager 215.

According an embodiment, as it is determined that the corresponding application is not the application registered with the authentication manager 215, in operation 305, the processor of the electronic device may continue loading the public content.

As it is identified that the corresponding application is the application registered with the authentication manager 215, in operation 303, the processor of the electronic device may operate a biometric authentication module. In an embodiment, at this time, the application may be loading the public content. According to an embodiment, the biometric authentication module may include a module for authentication of at least one of fingerprint recognition, iris recognition, blood vessel recognition, face recognition, or speech recognition.

According to an embodiment, as it is identified that the corresponding application is the application registered with the authentication manager 215, the processor of the electronic device may operate the biometric authentication module to prepare to perform biometric authentication. At this time, for example, the processor of the electronic device may operate one or more biometric authentication modules such that the user is able to perform authentication with any of a fingerprint, an iris, a blood vessel, a face, or a voice and may operate a biometric authentication module corresponding to an authentication method at the time of registering the corresponding application with the authentication manager 215.

According to an embodiment, the processor of the electronic device may display a UI that biometric authentication is waiting on a display device (e.g., a display device 160 of FIG. 1) for the user. According to another embodiment, the processor of the electronic device may fail to display the UI that the biometric authentication is waiting for the user. According to an embodiment, the processor of the electronic device may automatically perform a scan by means of at least one biometric authentication module even without displaying the UI that the biometric authentication is waiting for the user, thus performing user authentication.

For example, the processor of the electronic device may operate a fingerprint sensor to wait and may attempt to perform fingerprint recognition and authentication without displaying a separate UI, when a fingerprint contact occurs on the fingerprint sensor.

For another example, the processor of the electronic device may operate an iris sensor to wait and may attempt to perform iris recognition and authentication without displaying a separate UI, when iris information of the user is located on the fingerprint sensor.

For example, the processor of the electronic device may operate a face recognition sensor to wait and may attempt to perform face recognition and authentication without displaying a separate UI, when face information of the user is located on the face recognition sensor.

For another example, the processor of the electronic device may operate a speech recognition sensor to wait and may attempt to perform speech recognition and authentication without displaying a separate UI, when it is determined that voice information of the user is input.

According to an embodiment, the processor of the electronic device may perform the above-mentioned various biometric authentication methods one after another in a specified order or may perform sensing at the same time. For example, the processor of the electronic device may perform at least one of the above-mentioned biometric authentication methods. For another example, the processor of the electronic device may perform the above-mentioned various biometric authentication methods based on a surrounding environment or a condition. According to the above-mentioned method, the electronic device may fail to interfere with a display screen of the application because of not displaying a UI for biometric authentication.

In operation 304, the processor of the electronic device may receive the biometric authentication input of the user and may identify whether the biometric authentication of the user is successful.

According an embodiment, when the biometric authentication fails, the biometric authentication module may deliver that the biometric authentication fails to the authentication manager 215 and/or the processor. According to an embodiment, as it is recognized that the biometric authentication fails, in operation 305, the processor of the electronic device may continue loading the public content.

According an embodiment, when the biometric authentication is successful, the biometric authentication module may deliver that the biometric authentication is successful to the authentication manager 215 and/or the processor. As it is recognized that the biometric authentication is successful while loading the public content to prepare to launch the application, in operation 306, the processor of the electronic device may load user-dedicated content. According to an embodiment, the user-dedicated content may be content provided to an authenticated user when user authentication is successful in the application or user-customized content.

According an embodiment, as it is identified that the biometric authentication is successful, the processor of the electronic device may store information about the biometric authentication in a memory (e.g., a memory 130 of FIG. 1). According to an embodiment, the information about the biometric authentication may include information about at least one of a name of the corresponding application, whether a biometric authentication request occurs, whether the biometric authentication is successful, a type of biometric authentication, the authentication of which is completed, or whether reuse of biometric authentication information is allowed. According to an embodiment, the authentication manager 215 (or the processor) may store information about at least one of the name of the corresponding application, whether the biometric authentication request occurs, whether the biometric authentication is successful, a type of the biometric authentication occurring, or whether the reuse of the biometric authentication information is allowed in the memory.

According to an embodiment, the processor of the electronic device may determine whether reuse of biometric authentication information is allowed to be included in information about biometric authentication to be stored. According to an embodiment, in determining whether the reuse of the biometric authentication information is allowed, the processor of the electronic device may consider at least one of a type of the corresponding application, a type of data used in the corresponding application, a type of biometric authentication, the authentication of which is completed while the corresponding application is launched, a type of data used in an operation requiring authentication executed while the corresponding application is running after the corresponding application is launched, or a frequency where biometric authentication is requested while the corresponding application is running. According to an embodiment, the type of the data used in the operation requiring the authentication executed while the corresponding application is running after the corresponding application is launched and/or the frequency where the biometric authentication is requested while the corresponding application is running may be information according to a usage record of the corresponding application up to now rather than the information collected in operation 304.

According to an embodiment, in operation 306, when storing the information about the biometric authentication, the processor of the electronic device may assign and store a security level according to a type of the performed biometric authentication to the performed biometric authentication in the memory. According to an embodiment, the biometric authentication capable of being performed by the electronic device may include at least one of fingerprint authentication, iris authentication, blood vessel authentication, face authentication, and speech authentication. According to an embodiment, as shown in Table 1 below, when the fingerprint authentication, the iris authentication, or the blood vessel authentication in which a misrecognition rate for others is relatively low is performed, the processor of the electronic device may classify and store information in which the corresponding biometric authentication is performed into a high security level. When the face recognition or the speech authentication is performed, the processor of the electronic device may classify and store the information in which the corresponding biometric authentication is performed into a low security level. However, Table 1 corresponds to an example, but not limited thereto.

TABLE 1

|  | High security level | Low security level |
| --- | --- | --- |
| Type of biometric authentication | Fingerprint authentication, Iris authentication, Blood vessel authentication | Face authentication, Speech authentication |

According to an embodiment, when storing the information about the biometric authentication in operation 306, in conjunction with data used in an operation requiring biometric authentication executed while the application is running after the application is launched, the processor of the electronic device may assign and store a security level according to a type of the data in the memory. According to an embodiment, the processor of the electronic device may classify and store data used for biometric authentication in the application for each security level depending on importance of the data. Alternatively, according to an embodiment, the processor of the electronic device may classify and store the data for each security level depending on a type of the application which performs the biometric authentication.

For example, when ID-related data, payment-related data (e.g., a public certificate, an account number, a card number, or a payment-related password), or finance-related data (e.g., a public certificate, an account number, or an account password) is used in the application in the operation requiring the biometric authentication executed while the application is running, the operation of using the corresponding data may be classified and stored into a high security level. When the other data is used, the operation of using the corresponding data may be classified and stored into a low security level.

According to an embodiment, as shown in Table 2 below, when biometric authentication is performed to use ID-related data, payment-related data, finance-related data, or security-related data, which requires relatively high security, the corresponding operation may be classified and stored into a high security level, and, when biometric authentication is performed to use data of a phone application, data of a messenger application, data of a memo application, or data of a secret mode of an Internet browser, which requires relatively low security, the corresponding operation may be classified and stored into a low security level. However, Table 2 corresponds to an example, and the classification of the security level of the application may be set more variously according to an embodiment.

TABLE 2

|  | High security level | Low security level |
|---|---|---|
| Type of application or Type of data used in operation requiring authentication in application | ID-related data, Payment-related data, Finance-related data, Security-related data | Data of phone application, Data of messenger application, Data of memo application, Data of secret mode of Internet browser |

According to an embodiment, when storing the information about the biometric authentication in operation 306, the processor of the electronic device may classify and store a security level in conjunction with the corresponding application depending on how many times biometric authentication is requested while the corresponding application is running. For example, a security level of the corresponding application may be determined as the frequency of biometric authentication requests irrespective of whether the corresponding application is any type of application such as payment, ID authentication, or shopping.

According to an embodiment, as shown in Table 3 below, when biometric authentication is requested at least once on average while the application is running, the corresponding application may be classified and stored into a high security level. When biometric authentication is requested at least a specified number of times (e.g., 0.3 times on average) while the application is running, the corresponding application may be classified and stored into a medium security level. When biometric authentication is requested less than the specified number of times (e.g., 0.3 times on average) while the application is running, the corresponding application may be classified and stored into a low security level. However, Table 3 corresponds to an example. The criterion of the frequency of biometric authentication requested while the application is running may be set variously according to an embodiment, and the classification of the security level of the application may be more variously according to an embodiment.

TABLE 3

|  | High security level | Medium security level | Low security level |
|---|---|---|---|
| Frequency of biometric authentication requests | biometric authentication is requested at least once on average when application is executed once | biometric authentication is requested at least 0.3 times on average when application is executed once | biometric authentication is requested less than 0.3 times on average when application is executed once |

According to an embodiment, when storing the information about the biometric authentication in operation 306, the processor of the electronic device may determine whether to reuse biometric authentication information generated in an application launching operation in an operation requiring authentication which occurs when the application is in use after the application is launched and may store the biometric authentication information in the memory in conjunction with the information about the biometric authentication, the authentication of which is completed. According to an embodiment, the processor of the electronic device may determine whether to reuse biometric authentication information performed in the application launching operation, in the operation requiring the authentication which occurs when the application is in use after the application is launched, based on a security level determined according to a type of the performed biometric authentication (e.g., a security level determined based on Table 1), a security level determined according to a type of an application (or a type of data used in an operation requiring authentication in the application) (e.g., a security level determined based on Table 2), and/or a security level determined by various numerical values such as the frequency of biometric authentication requests while the application is running.

According to an embodiment, the processor of the electronic device may determine that it is possible to reuse the biometric authentication information performed in the application launching operation during only a specified duration after the biometric authentication is performed depending on the security level determined according to the type of the performed biometric authentication (e.g., the security level determined based on Table 1). For example, the specified tion, depending on the result of tracking a target (e.g., an iris or a face) used for the biometric authentication while the application is running and may store it together with the biometric authentication information in the memory.

According to an embodiment, the processor of the electronic device may determine whether to reuse biometric authentication information generated in the application launching operation based on Table 4 in the operation requiring the authentication which occurs when the application is in use after the application is launched. However, Table 4 is only an example, but not limited thereto.

TABLE 4

|  | Fingerprint authentication, Iris authentication, Blood vessel authentication | Face authentication, Speech authentication |
|---|---|---|
| Security application, Security document | Reuse of biometric authentication information is allowed in limited manner | Reuse of biometric authentication information is not allowed |
| ID-related data, Payment-related data, Finance-related data | Reuse of biometric authentication information is allowed | Reuse of biometric authentication information is not allowed |
| Data of phone application, Data of messenger application, Data of memo application, Data of secret mode of Internet browser | Reuse of biometric authentication information is allowed | Reuse of biometric authentication information is allowed | duration may vary with the security level determined according to the type of the performed biometric authentication.

According to an embodiment, the processor of the electronic device may determine that it is possible to use the biometric authentication information performed in the application launching operation during only a specified duration after the biometric authentication is performed depending on the security level determined according to the type of the application (or the type of the data used in the operation requiring the authentication in the application) (e.g., the security level determined based on Table 2). For example, the specified duration may vary with the security level determined according to the type of the application (or the type of data used in the operation requiring the authentication in the application).

According to an embodiment, the processor of the electronic device may determine that it is possible to reuse the biometric authentication information performed in the application launching operation during only a specified duration after the biometric authentication is performed depending on the security level determined by various numerical values such as the frequency of biometric authentication requests while the application is running. For example, the specified duration may vary with the security level determined by the various numerical values such as the frequency of biometric authentication requests while the application is running.

According to an embodiment, the processor of the electronic device may change or maintain the specified duration when it is possible to reuse the biometric authentication information performed in the application launching operation, depending on whether there is a change in whether a wearable device (e.g., a smart watch) connected with the electronic device while the application is running.

According to an embodiment, the processor of the electronic device may change or maintain the specified duration when it is possible to reuse the biometric authentication information performed in the application launching opera- According to an embodiment, the processor of the electronic device may determine that high security is required, when the corresponding application is a security application or when the type of the data used in the operation requiring the authentication in the application is a security document, and may classify and store that the reuse of the biometric authentication information performed in the application launching operation is allowed in a limited manner although the type of the performed biometric authentication is any one of fingerprint authentication, iris authentication, or blood vessel authentication with a low misrecognition rate. According to an embodiment, the limited allowance of the reuse of the biometric authentication information may be separately determining whether reuse is allowed depending on a security application or details of a security document.

According to an embodiment, when the corresponding application is a security application or when the type of the data used in the operation requiring the authentication in the application is a security document, the processor of the electronic device may classify and store that the reuse of the biometric authentication information performed in the application launching operation is not allowed when the type of the performed biometric authentication is any one of face authentication or speech authentication with a relatively high misrecognition rate.

According to an embodiment, when the type of the data used in the operation requiring the authentication in the application is any one of ID-related data, payment-related data, or finance-related data, the processor of the electronic device may classify and store that the reuse of the biometric authentication information performed in the application launching operation is allowed when the type of the performed biometric authentication is any one of fingerprint authentication, iris authentication, or blood vessel authentication with a low misrecognition rate.

According to an embodiment, when the type of the data used in the operation requiring the authentication in the application is any one of ID-related data, payment-related data, or finance-related data, the processor of the electronic device may classify and store that the reuse of the biometric authentication information performed in the application launching operation is not allowed when the type of the performed biometric authentication is any one of face authentication or speech authentication with a relatively high misrecognition rate.

According to an embodiment, when the type of the data used in the operation requiring the authentication in the application is any one of data of a phone application, data of a messenger application, data of a memo application, or data of a secret mode of an Internet browser, the processor of the electronic device may classify and store that the reuse of the biometric authentication information performed in the application launching operation is allowed when the type of the performed biometric authentication is any one of fingerprint authentication, iris authentication, or blood vessel authentication with a low misrecognition rate.

According to an embodiment, the processor of the electronic device may determine that relatively low security is required, when the type of the data used in the operation requiring the authentication in the application is any one of data of the phone application, data of the messenger application, data of the memo application, or data of the secret mode of the Internet browser, and may classify and store that the reuse of the biometric authentication information performed in the application launching operation although the type of the performed biometric authentication is any one of face authentication or speech authentication with a relatively high misrecognition rate.

According to another embodiment, when an average security level according to a type of performed biometric authentication, a type of an application (or a type of data used in the application), or the frequency of biometric authentication requests is the highest level, although the biometric authentication is performed when the application is launched and the authenticated biometric information is stored in the memory, the processor of the electronic device may classify and store the stored biometric authentication information as authentication information which is not reused in an operation requiring authentication which occurs when the application is in use after the application is launched.

According to another embodiment, when the average security level according to the type of the performed biometric authentication, the type of the application (or the type of the data used in the application), or the frequency of biometric authentication requests is an intermediate level, the processor of the electronic device may classify and store biometric authentication information which is performed when the application is launched and is stored in the memory as authentication information capable of being reused in the operation requiring the authentication which occurs when the application is in use after the application is launched, until the electronic device is executed in a locked state.

According to another embodiment, when the average security level according to the type of the performed biometric authentication, the type of the application (or the type of the data used in the application), or the frequency of biometric authentication requests is greater than or equal to a specified level, the processor of the electronic device may classify and store biometric authentication information performed when the application is launched as authentication information capable of being reused in a secure area (e.g., a trust zone of the ARM® company) with a relatively high security degree, which is a memory area divided and managed as a separate area in a memory area or a separate memory area divided physically in a memory chip. According to an embodiment, at this time, a secure key for accessing the biometric authentication information of the secure area may be stored together in the secure area and may have a security level above a specified level. According to another embodiment, the processor of the electronic device may determine a security level of the biometric authentication information depending on whether an area which stores the biometric authentication information performed when the application is launched is a secure area (e.g., the trust zone of the ARM® company) with a relatively high security degree and a security level of a secure key for accessing the biometric authentication information of the secure area to determine whether to reuse the biometric authentication information.

According to another embodiment, when the average security level according to the type of the performed biometric authentication, the type of the application (or the type of the data used in the application), or the frequency of biometric authentication requests is a low level, the processor of the electronic device may classify and store biometric authentication information which is performed when the application is launched and is stored in the memory as authentication information capable of being reused in the operation requiring the authentication which occurs when the application is in use after the application is launched, until the corresponding application is ended.

According to another embodiment, the processor of the electronic device may classify and store biometric authentication information which is performed when the application is launched and is stored in the memory as being discarded when a certain time elapses after the launching of the application is completed, using a time when the corresponding application is run on average.

According to an embodiment, when there is a change in whether a wearable device (e.g., a smart watch) connected with the electronic device is worn while the application is running, the processor of the electronic device may classify and store biometric authentication information which is performed when the application is launched and is stored in the memory. For example, after user authentication is performed by means of the wearable device connected with the electronic device, when there is a change in whether the user wears the wearable device (e.g., when the wearing of the smart watch worn by the user is released), biometric authentication information which is stored in the memory after user authentication is performed may be discarded. For another example, after user authentication is performed by means of the wearable device connected with the electronic device, when there is no change in whether the user wears the wearable device (e.g., when the user continues wearing the worn smart watch), the biometric authentication information stored in the memory may be maintained.

According to another embodiment, the processor of the electronic device may classify and store biometric authentication information which is performed when the application is launched and is stored in the memory as being discarded, depending on the result of tracking a target (e.g., an iris or a face) used for biometric authentication when the application is running.

According to another embodiment, the processor of the electronic device may classify and store biometric authentication information which is performed when the application is launched and is stored in the memory as being discarded, when switching to another application occurs over a certain number of times or when the electronic device becomes a locked state, using information about how many transitions to other applications occur after the corresponding application is run.

According to another embodiment, the processor of the electronic device may store biometric authentication information performed when the application is launched in a secure area (e.g., the trust zone of the ARM® company) with a relatively high security degree, which is a memory area divided and managed as a separate area in a memory area or a separate memory area divided physically in a memory chip. At this time, a secure key for accessing the biometric authentication information of the secure area may be stored together in the secure area and may be discarded when a certain duration elapses. According to an embodiment, when the secure key elapses, the biometric authentication information which is performed when the application is launched and is stored in the secure area may also be discarded.

According to an embodiment, the electronic device may perform authentication without an actual authentication operation with respect to a biometric authentication request capable of being generated after the application is launched, which will be described below in FIG. 4 based on the information stored in operation 306.

In operation 307, the processor of the electronic device may complete the launching of the application. The launched application may immediately provide user-dedicated content without providing public content.

According to an embodiment, the processor of the electronic device may perform operation 303, operation 304, operation 305, and operation 306 of FIG. 3 at the same time as an operation until the launching of the application is completed in operation 307 from starting to prepare for the launching of the application in operation 302. When authentication is performed by means of only software without separate hardware for biometric authentication like a pattern recognition method or a PIN password scheme, it may interfere with a current screen where the application is being launched to receive an input. However, this is because authentication through biometric authentication may proceed at the same time without interfering with a screen where the application is being launched because of passing through authentication through a biometric authentication mode which is separate hardware. Thus, according to an embodiment, the usability of the application of the user may be improved by means of user authentication performed at the same time as the execution of the application, and a time until the application displaying user-dedicated content is run may be reduced.

Hereinafter, a description will be given of an operation when an electronic device executes an operation requiring authentication while an application is running according to an embodiment with reference to FIG. 4.

Figure 4:
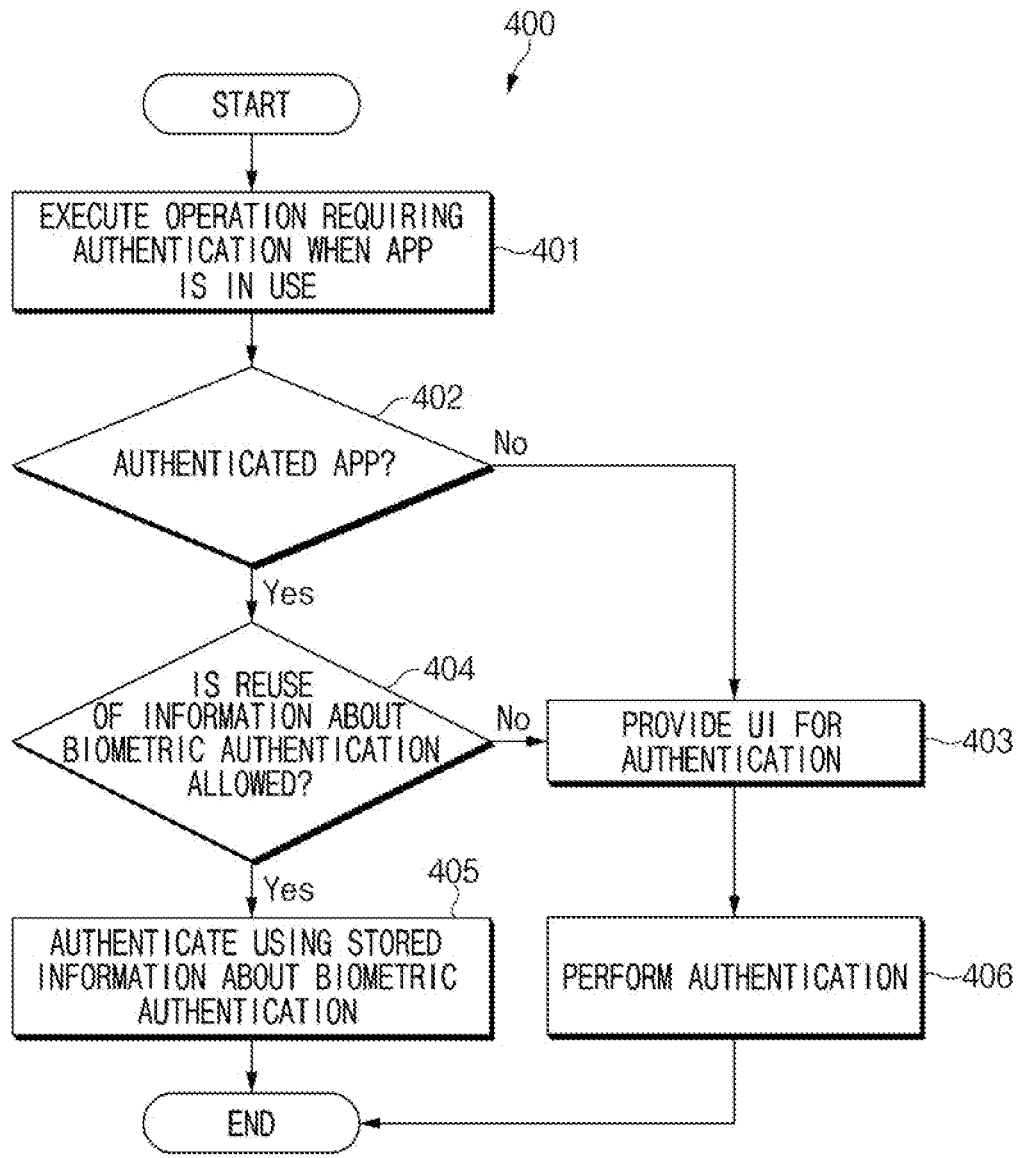
FIG. 4 is a flowchart illustrating an operation when an electronic device executes an operation requiring authentication while an application is running according to an embodiment.

FIG. 4 is a flowchart 400 illustrating an operation when an electronic device executes an operation requiring authentication while an application is running according to an embodiment. The operation of the electronic device described below may be performed by a processor (e.g., a processor 120 of FIG. 1) of an electronic device (e.g., an electronic device 101 of FIG. 1).

Referring to FIG. 4, in operation 401, the processor (e.g., the processor 120 of FIG. 1) of the electronic device (e.g., the electronic device 101 of FIG. 1) may execute an operation requiring authentication depending on an input of a user while an application (app) (e.g., an application 146 of FIG. 1) stored in a memory (e.g., a memory 130 of FIG. 1) of the electronic device is running. According to an embodiment, the execution of the operation requiring the authentication may refer to when executing a payment operation when the application is in use or when executing a finance-related processing (e.g., account transfer or the like) operation when the application is in use.

In operation 402, the electronic device may determine whether the currently run application is an application authenticated in an application launching operation. According to an embodiment, being authenticating may mean that biometric authentication is performed in the application launching operation or that information about biometric authentication, the authentication of which is successful, is stored in the electronic device.

When it is not the authenticated application in operation 402, in operation 403, the electronic device may provide a user with a user interface (UI) for authentication according to the execution of the operation requiring the authentication. For example, when the launched application is not previously authenticated, the electronic device may provide a UI for authentication.

When it is the authenticated application in operation 402, in operation 404, the electronic device may determine whether the reuse of information about biometric authentication, which is stored in the application launching operation, is allowed as it is determined that the currently run application is the application authenticated in the application launching operation. According to an embodiment, the processor of the electronic device may determine whether the reuse of the information about the biometric authentication is allowed, based on whether the reuse of the information about the biometric authentication, which is stored in the application launching operation, as being allowed. According to an embodiment, in determining whether the reuse of the information about the biometric authentication is allowed, the processor of the electronic device may consider whether the information about the biometric authentication, which is stored in the application launching operation, is discarded due to the end of the application or the excess of a time when the information about the biometric authentication is stored.

According to an embodiment, when it is determined that the reuse of the information about the biometric authentication is not allowed, in operation 403, the processor of the electronic device may provide the user with a UI for authentication as the operation requiring the authentication is executed.

As it is determined that the reuse of the information about the biometric authentication is allowed, in operation 405, the processor of the electronic device may perform authentication of the operation requiring the authentication using the information about the biometric authentication. As a result, the user may immediately complete authentication without an input for biometric authentication in the operation requiring the authentication executed while the application is running with respect to the application which performs the authentication when the application is launched. Furthermore, because a security level determined by various numerical values such as a type of biometric authentication, a type of the application (or a type of data used in the operation requiring the authentication in the application), or the frequency of biometric authentication requests while the application is running is considered in such an operation, the stability of security as well as convenience may be ensured.

Hereinafter, a description will be given of an operation of registering an application with an authentication manager 215 in an electronic device according to an embodiment with reference to FIG. 5.

Figure 5:
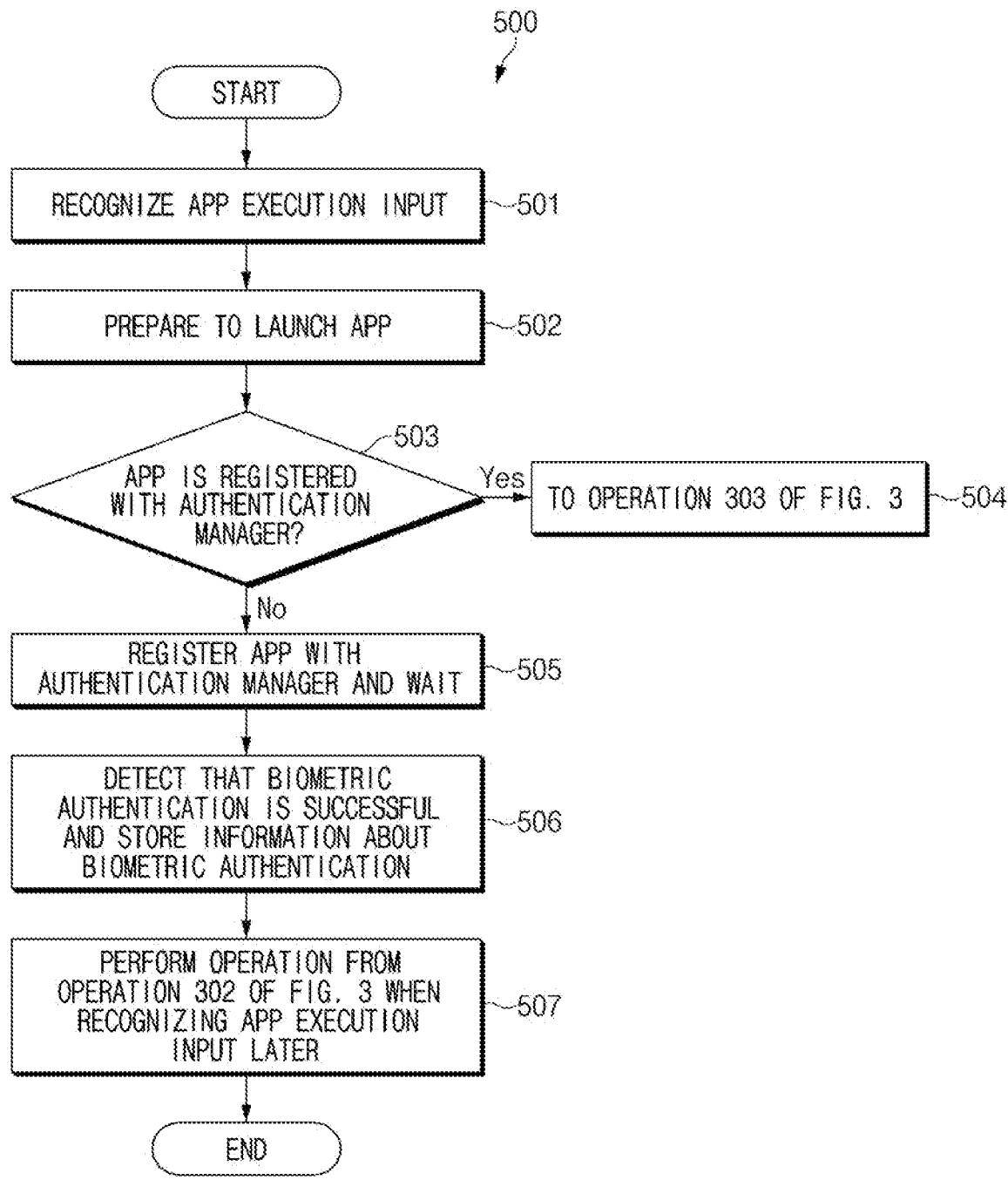
FIG. 5 is a flowchart illustrating an operation of registering an application with an authentication manager in an electronic device according to an embodiment.

FIG. 5 is a flowchart 500 illustrating an operation of registering an application with an authentication manager 215 in an electronic device according to an embodiment. The operation of the electronic device described below may be performed by a processor (e.g., a processor 120 of FIG. 1) of an electronic device (e.g., an electronic device 101 of FIG. 1).

Referring to FIG. 5, in operation 501, the processor of the electronic device (e.g., the electronic device 101 of FIG. 1) may recognize an input for executing an application (app) (e.g., an application 146 of FIG. 1) stored in a memory (e.g., a memory 130 of FIG. 1) of the electronic device. According to an embodiment, the application execution input may be an input for touching an icon of the application such that a user runs the application.

In operation 502, the processor of the electronic device may prepare to launch the application as the user recognizes the application execution input. For example, the processor of the electronic device may load a resource associated with the application to prepare to launch the application and may perform the other preparation for launching the application.

According an embodiment, in operation 503, the processor of the electronic device may identify whether the corresponding application is an application registered with the authentication manager 215 while the application is launched. According to an embodiment, the processor of the electronic device may deliver that the recognition of the application execution input occurs to the authentication manager 215, and the authentication manager 215 may identify whether the corresponding application is an application registered with the authentication manager 215 as it is received that the recognition of the application execution input occurs. According an embodiment, as it is recognized that the recognition of the application execution input occurs, the processor of the electronic device may identify whether the corresponding application is an application registered with the authentication manager 215.

When it is identified that the corresponding application is the application registered with the authentication manager 215 in operation 503, in operation 504, the processor of the electronic device may perform an operation of FIG. 3 from operation 304 of FIG. 3 (executing a biometric authentication module).

When it is identified that the corresponding application is the application which is not registered with the authentication manager 215 in operation 503, in operation 505, the processor of the electronic device may register the corresponding application with the authentication manager 215 to wait.

In operation 506, the processor of the electronic device may attempt to perform biometric authentication while the user uses the corresponding application and may detect whether the biometric authentication is successful. According to an embodiment, when the biometric authentication fails, the biometric authentication may be reattempted specified N times. According to an embodiment, when the biometric authentication fails although reattempting N times, the electronic device may end the process of registering the application with the authentication manager 215 without storing information about the biometric authentication in its memory. According to an embodiment, when detecting the success in the biometric authentication, the processor (or the authentication manager 215) of the electronic device may store information about the successful biometric authentication in the memory (e.g., a memory 130 of FIG. 1). According to an embodiment, the information about the biometric authentication may be substantially the same as the contents described above in FIG. 3. In operation 507, when recognizing the input for executing the corresponding application in the future, the electronic device may perform an operation of FIG. 3 from operation 302 of FIG. 3. for example, the electronic device may perform biometric authentication at the same time as preparing to launch the application as the corresponding application execution input is received with respect to an application in which a user attempts to perform biometric authentication at least once, based on the information about the biometric authentication, which is stored in operation 506. At this time, according to an embodiment, a UI indicating that biometric authentication is performed may be provided. According to an embodiment of the disclosure, because the user performs biometric authentication during an application loading operation, when the loading of the application is completed, an application which displays user-dedicated content may be launched.

Hereinafter, a description will be given of an operation of an electronic device according to an embodiment with reference to FIG. 6.

Figure 6:
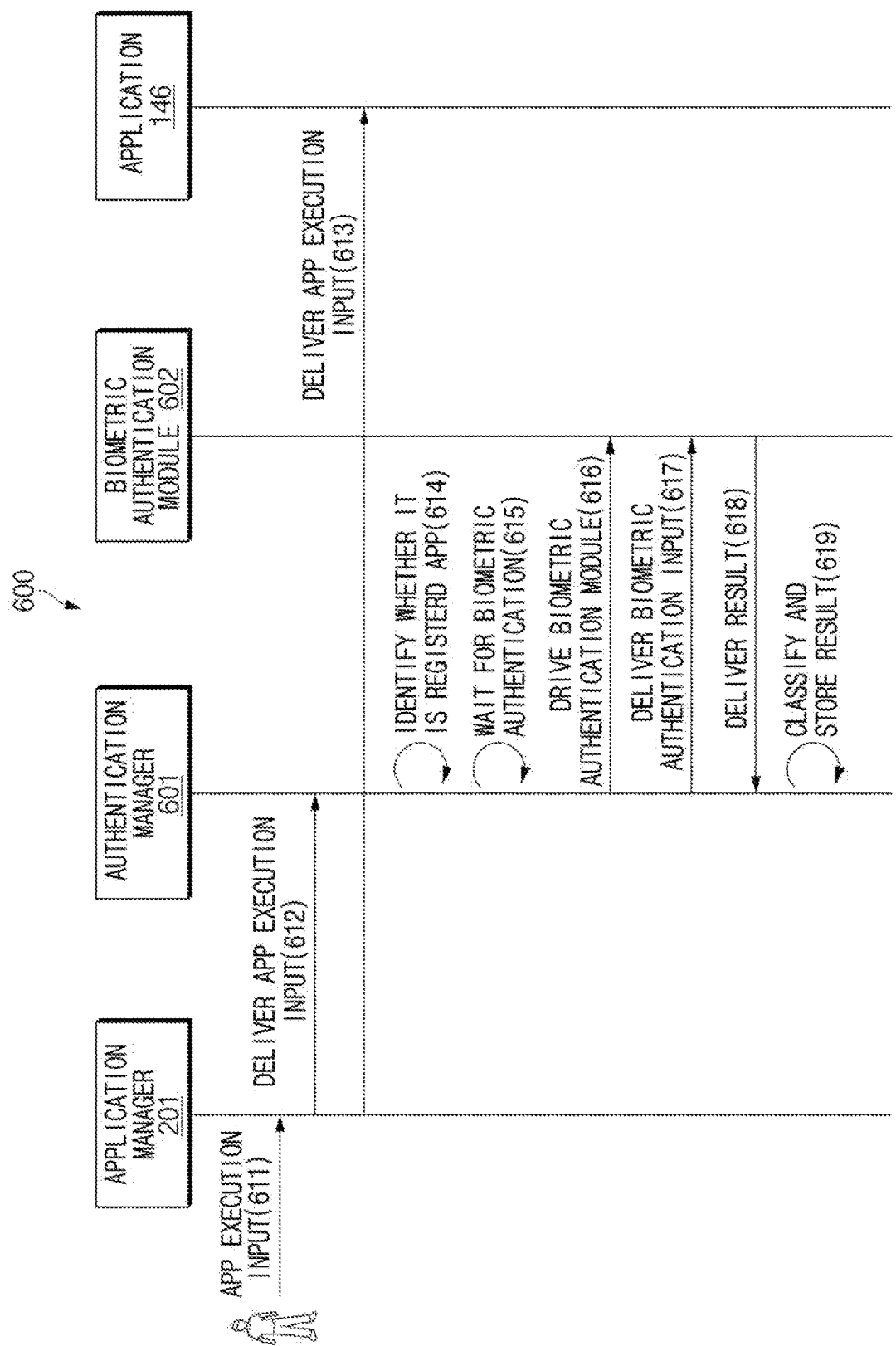
FIG. 6 is a flowchart illustrating an operation of an electronic device according to an embodiment.

FIG. 6 is a flowchart 600 illustrating an operation of an electronic device according to an embodiment. The operation of the electronic device described below may be performed by a processor (e.g., a processor 120 of FIG. 1) of an electronic device (e.g., an electronic device 101 of FIG. 1). Substantially the same configuration as the embodiment described above may be referred to as the same reference numeral, and a description of substantially the same contents as the embodiment described above may be omitted.

Referring to FIG. 6, the electronic device (e.g., the electronic device 101 of FIG. 1) may include an application manager 201, an authentication manager 215 or 601, a biometric authentication module 602, and/or an application 146.

According to an embodiment, the application manager 201 of the electronic device may recognize an input for executing the application 146 from a user in operation 611. According to an embodiment, the application execution input may be an input for touching an icon of the application such that the user runs the application.

According to an embodiment, the application manager 201 may deliver that the application execution input occurs to the authentication manager 215 or 601 in operation 612. As another example, the application manager 201 may deliver that the application execution input occurs to the application in operation 613. The application manager 201 may prepare to launch the application as the user recognizes the application execution input. The application manager 201 may load a resource associated with the application to prepare to launch the application and may perform the other preparation for launching the application.

According to an embodiment, while the application is launched, the authentication manager 215 or 601 may identify whether the corresponding application is an application registered with the authentication manager 215 or 601 in operation 614.

According to an embodiment, as it is identified that the corresponding application is the application registered with the authentication manager 215 or 601, the authentication manager 215 or 601 may wait for biometric authentication in operation 615. As it is identified that the corresponding application is the application registered with the authentication manager 215, the authentication manager 215 or 601 may operate the biometric authentication module 602 for biometric authentication. At this time, the application may still be preparing for launching. According to an embodiment, the biometric authentication module 602 may include a module for authentication of at least one of fingerprint recognition, iris recognition, blood vessel recognition, face recognition, or speech recognition. At this time, for example, the processor of the electronic device may operate a plurality of biometric authentication modules such that the user is able to perform authentication with any of a fingerprint, an iris, a blood vessel, a face, or a voice and may operate a biometric authentication module corresponding to an authentication method at the time of registering the corresponding application with the authentication manager 215.

According to an embodiment, the processor of the electronic device may display a UI that biometric authentication is waiting on a display device (e.g., a display device 160 of FIG. 1) for the user. According to an embodiment, the processor of the electronic device may fail to display the UI that the biometric authentication is waiting for the user. According to an embodiment, the processor of the electronic device may perform user authentication using at least one biometric authentication module even without displaying the UI that the biometric authentication is waiting for the user.

According to an embodiment, the authentication manager 215 or 601 may deliver that the biometric authentication input of the user is received to the biometric authentication module 602 in operation 617.

According to an embodiment, the biometric authentication module 602 may deliver the result of biometric authentication for the received biometric authentication input to the authentication manager 215 or 601 in operation 618.

According to an embodiment, when it is determined that the biometric authentication is successfully completed, the authentication manager 215 or 601 may classify the result of the biometric authentication to store information about the biometric authentication in a memory in operation 619. According to an embodiment, the information about the biometric authentication may be substantially the same as the contents described above in FIG. 3.

Hereinafter, a description will be given of an operation of an electronic device according to an embodiment with reference to FIG. 7.

Figure 7:
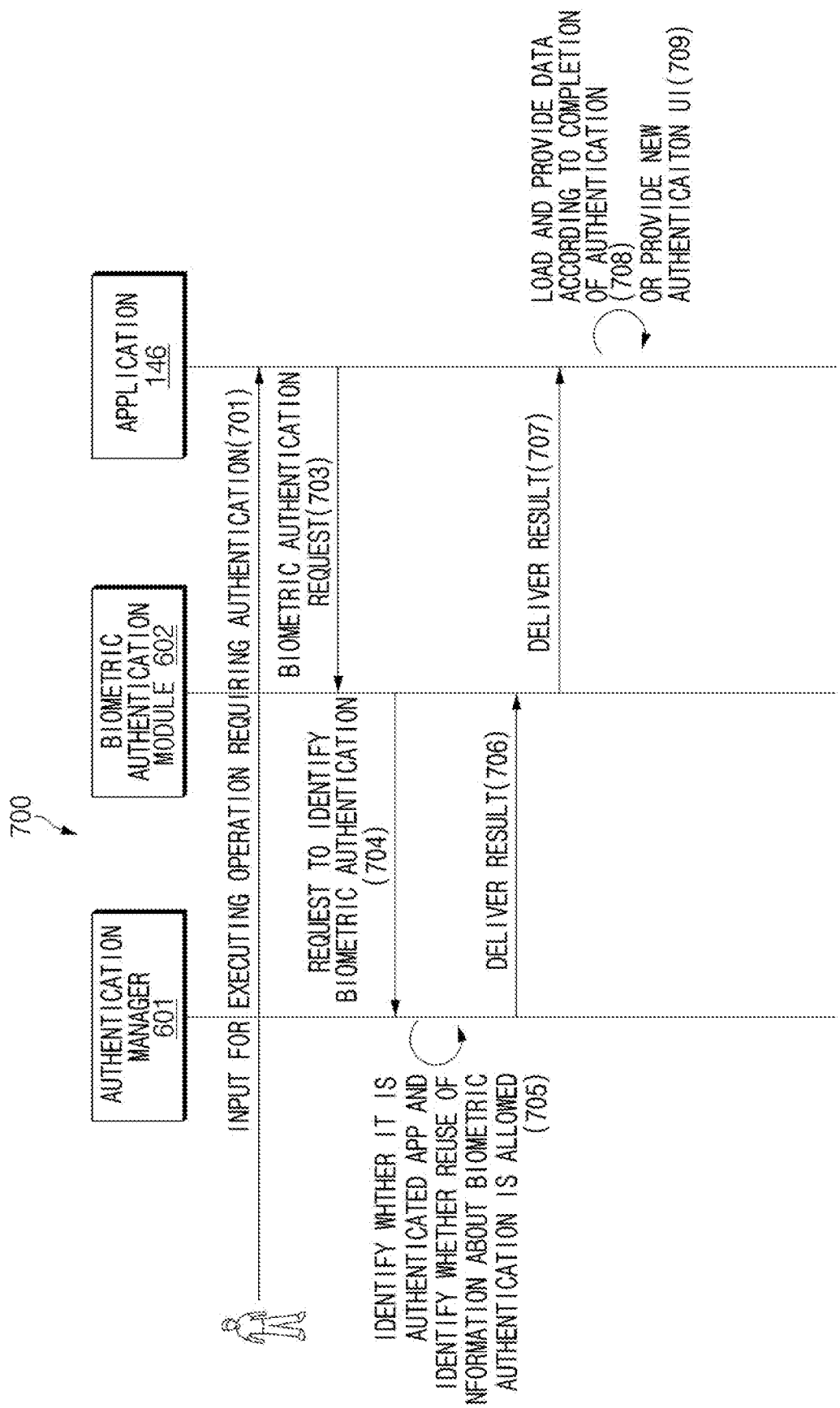
FIG. 7 is a flowchart illustrating an operation of an electronic device according to an embodiment.

FIG. 7 is a flowchart 700 illustrating an operation of an electronic device according to an embodiment. The operation of the electronic device described below may be performed by a processor (e.g., a processor 120 of FIG. 1) of an electronic device (e.g., an electronic device 101 of FIG. 1). Substantially the same configuration as the embodiment described above may be referred to as the same reference numeral, and a description of substantially the same contents as the embodiment described above may be omitted.

Referring to FIG. 7, while an application 146 is running, the electronic device (e.g., the electronic device 101 of FIG. 1) may recognize a user input for executing an operation requiring authentication in the application in operation 701. According to an embodiment, the input for executing the operation requiring the authentication may be an input where a user touches an icon of the corresponding operation to execute the operation requiring the authentication. The application 146 may recognize a user input for executing the operation requiring the authentication in the application. The application 146 may request biometric authentication from a biometric authentication module 602 in operation 703.

The biometric authentication module 602 may deliver that the biometric authentication request occurs to an authentication manager 215 or 601 to request to identify biometric authentication in operation 704.

According to an embodiment, the authentication manager 215 or 601 may be designed to receive a request for biometric authentication which occurs in the electronic device and the result of the biometric authentication. According to an embodiment, when the request for biometric authentication for a specific application is delivered to the biometric authentication module 602, the authentication manager 215 or 601 may detect it, and may store information indicating that the biometric authentication request for the corresponding application occurs in a memory. As another example, the authentication manager 215 or 601 may be designed to detect an event for normal completion of biometric authentication and may be designed to store information indicating that the biometric authentication is normally completed in the memory with respect to the corresponding application. As another example, the authentication manager 215 or 601 may be designed to store information indicating whether certain biometric authentication (e.g., iris authentication, fingerprint authentication, or face authentication) for a specific application is successful in the memory.

According to an embodiment, the authentication manager 215 or 601 may identify whether the currently run application 146 is an application authenticated in an application launching operation and whether the reuse of information about biometric authentication is allowed in operation 705. According to an embodiment, being authenticated may mean that biometric authentication is performed in the application launching operation or that information about biometric authentication, the authentication of which is successful, is stored in the electronic device. According to an embodiment, that the reuse of the information about the biometric authentication is allowed may mean that the information about the biometric authentication, which is stored in the application launching operation, is classified and stored as allowing the reuse. According to an embodiment, a description of the case where the information about the biometric authentication is classified and stored as allowing the reuse may be substantially the same as the contents described above with reference to FIG. 3.

According to an embodiment, the authentication manager 215 or 601 may deliver the result of identifying whether the corresponding application is authenticated and/or whether the reuse of biometric authentication information is allowed to the biometric authentication module 602 in operation 706, and the biometric authentication module 602 may deliver the result of whether authentication is successful according to it to the application 146 in operation 707.

According to an embodiment, when the application 146 is authenticated in the launching operation and when the reuse of the information about the biometric authentication is allowed, the authentication manager 215 or 601 may deliver the information about the biometric authentication, the authentication of which is completed, to the biometric authentication module 602 in operation 706. The biometric authentication module 602 may successfully complete authentication without a separate biometric authentication input of the user using the information about the biometric authentication and may deliver that the authentication is completed to the application 146 in operation 707.

According to an embodiment, when the application 146 is not authenticated in the launching operation and when the reuse of the information about the biometric authentication is not allowed, the authentication manager 215 or 601 may deliver information indicating that new authentication is required to the biometric authentication module 602 in operation 706. The biometric authentication module 602 may deliver information indicating that authentication is required to the application 146 in operation 707.

According to an embodiment, when receiving that authentication for an operation requiring authentication is completed from the biometric authentication module 602, the application 146 may load data according to the completion of the authentication of the operation requiring the authentication and may provide the user with the data in operation 708. As another example, when receiving the information indicating that the authentication is required from the biometric authentication module 602, the application 146 may provide the user with a UI for requesting authentication in operation 709.

An electronic device 101 according to an embodiment of the disclosure may include a biometric authentication device, a memory 130 configured to store at least one application 146, and at least one processor, for example a processor 120, connected with the biometric authentication device and the memory. The memory may store one or more instructions, when executed, cause the at least one processor to receive an input for executing the application (e.g., operation 301 of FIG. 3), load public content of the application based on receiving the input for executing the application (e.g., operation 302 of FIG. 3), operate the biometric authentication device to perform a biometric authentication operation while loading the public content of the application (e.g., operation 303 of FIG. 3), load the public content and dedicated content associated with the biometric authentication (e.g., operation 306 of FIG. 3) to complete the launching of the application (e.g., operation 307 of FIG. 3), based on the biometric authentication device completing the biometric authentication.

According to an embodiment of the disclosure, the instructions may cause the at least one processor to store information about the biometric authentication in the memory, based on the biometric authentication device completing the biometric authentication (e.g., operation 306 of FIG. 3), and identify whether reuse of the information about the biometric authentication is allowed, based on receiving a user input for executing an operation requiring authentication while the application is running (e.g., operation 404 of FIG. 4).

According to an embodiment of the disclosure, the instructions may cause the at least one processor to complete authentication of the operation requiring the authentication without a user input for authentication, based on determining that the reuse of the information about the biometric authentication is allowed (e.g., operation 405 of FIG. 3).

According to an embodiment of the disclosure, information about the biometric authentication may include information about whether reuse of the information about the biometric authentication is allowed.

According to an embodiment of the disclosure, the instructions may cause the at least one processor to determine whether the reuse of the information about the biometric authentication is allowed, based on at least one of a type of the completed biometric authentication, a type of the application, a type of data used in the application, and a frequency at which authentication is performed while the application is running.

According to an embodiment of the disclosure, the biometric authentication device may include at least one of a camera for face recognition, a camera for iris recognition, a sensor for fingerprint recognition, a sensor for blood vessel recognition, or a microphone for speech recognition.

According to an embodiment of the disclosure, the memory may further include a program for an authentication manager 215. The instructions may cause the at least one processor to identify whether the application is registered with the program for the authentication manager 215, based on receiving the input for executing the application, operate the biometric authentication device while loading the public content of the application, based on determining that the application is registered with the program for the authentication manager 215, determine a biometric authentication method based on a biometric authentication history of a user associated with the application, and operate the biometric authentication device based on the determined biometric authentication method.

According to an embodiment of the disclosure, the instructions may cause the at least one processor to control such that the biometric authentication device perform a scan while the application is launched, without providing a user interface.

According to an embodiment of the disclosure, the instructions may cause the at least one processor to determine that information about the biometric authentication is discarded based on a predetermined time elapsing after the launching of the application is completed, wherein the predetermined time corresponds to, or is based on, an average execution time of the application.

According to an embodiment of the disclosure, the instructions may cause the at least one processor to determine that information about the biometric authentication is discarded, based on the at least one processor switching to another application more than a predetermined number of times after the launching of the application is completed or based on the electronic device entering a locked state.

A method for providing a biometric authentication function in an electronic device 101 including a biometric authentication device according to an embodiment of the disclosure may include receiving (e.g., operation 301 of FIG. 3) an input for executing an application 146 included in the electronic device, beginning a launching the application by loading (e.g., operation 302 of FIG. 3) public content of the application based on receiving the input for executing the application, operating (e.g., operation 303 of FIG. 3) the biometric authentication device of the electronic device to perform a biometric authentication while the public content of the application is loaded, and loading (e.g., operation 306 of FIG. 3) the public content and dedicated content associated with the completed biometric authentication to complete (e.g., operation 307 of FIG. 3) the launching of the application, based on the biometric authentication device completing the biometric authentication.

According to an embodiment of the disclosure, the method may further include storing (e.g., operation 306 of FIG. 3) information about the biometric authentication in a memory of the electronic device, based on the biometric authentication device completing the biometric authentication, and determining (e.g., operation 404 of FIG. 4) whether reuse of the information about the biometric authentication is allowed, based on receiving a user input for executing an operation requiring authentication while the application is running.

According to an embodiment of the disclosure, the method may further include completing (e.g., operation 405 of FIG. 4) the authentication of the operation requiring the authentication without a user input for authentication, based on determining that the reuse of the information about the biometric authentication is allowed.

According to an embodiment of the disclosure, information about the biometric authentication may include information about whether the reuse of the information about the biometric authentication is allowed.

According to an embodiment of the disclosure, the method may further include determining whether the reuse of the information about the biometric authentication is allowed, based on at least one of a type of the completed biometric authentication, a type of the application, a type of data used in the application, and a frequency at which authentication is performed while the application is running.

According to an embodiment of the disclosure, the biometric authentication device may include at least one of a camera for face recognition, a camera for iris recognition, a sensor for fingerprint recognition, a sensor for blood vessel recognition, or a microphone for speech recognition.

According to an embodiment of the disclosure, the method may further include determining whether the application is registered with a program for an authentication manager 215 of the electronic device, based on receiving an input for executing the application, operating the biometric authentication device while loading the public content of the application, based on determining that the application is registered with the program for the authentication manager 215, determining a biometric authentication method based on a biometric authentication history of a user associated with the application, and operating the biometric authentication device based on the determined biometric authentication method.

According to an embodiment of the disclosure, the method may further include controlling or allowing the biometric authentication device to perform a scan while the application is launched, without providing a user interface.

According to an embodiment of the disclosure, the method may further include determining that the information about the biometric authentication is discarded based on a predetermined time elapsing after the launching of the application is completed, wherein the predetermined time corresponds to, or is based on, an average execution time of the application.

According to an embodiment of the disclosure, the method may further include determining that the information about the biometric authentication is discarded, based on the at least one processor switching to another application occurs more than a predetermined number of times after the launching of the application is completed or based on the electronic device entering a locked state.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C" may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device comprising:
a biometric authentication sensor configured to obtain biometric information;
at least one processor; and
a memory configured to store an application and one or more instructions which, which executed by the at least one processor, cause the electronic device to:
receive an input for executing the application;
based on receiving the input for executing the application, begin launching the application by loading public content corresponding to the application, and determine whether the application is registered with an authentication manager program;
based on identifying that the application is registered with the authentication manager program, operate the biometric sensor to perform a biometric authentication while the public content is loaded; and
based on the biometric sensor completing the biometric authentication, complete the launching of the application by loading the public content and dedicated content associated with the biometric authentication.

2. The electronic device of claim 1, wherein the one or more instructions further cause the electronic device to:
based on the biometric sensor completing the biometric authentication, store information about the biometric authentication in the memory; and
based on receiving a user input for executing an operation requiring authentication while the application is running, identify whether reuse of the information about the biometric authentication is allowed.

3. The electronic device of claim 2, wherein the one or more instructions further cause the electronic device to:
based on identifying that the reuse of the information about the biometric authentication is allowed, complete the authentication of the operation without a user input for authentication.

4. The electronic device of claim 1, wherein information about the biometric authentication comprises information about whether reuse of the information about the biometric authentication is allowed.

5. The electronic device of claim 4, wherein the one or more instructions further cause the electronic device to:
identify whether the reuse of the information about the biometric authentication is allowed, based on at least one of a type of the completed biometric authentication, a type of the application, a type of data used in the application, and a frequency at which authentication is performed while the application is running.

6. The electronic device of claim 1, wherein the biometric sensor comprises at least one of a camera for face recognition, a camera for iris recognition, a sensor for fingerprint recognition, a sensor for blood vessel recognition, and a microphone for speech recognition.

7. The electronic device of claim 1, wherein the memory is further configured to store the authentication manager program, and
wherein the one or more instructions further cause the electronic device to:
determine a biometric authentication method based on a biometric authentication history of a user associated with the application; and
operate the biometric sensor based on the determined biometric authentication method.

8. The electronic device of claim 7, wherein the one or more instructions further cause the electronic device to:
control the biometric sensor to perform a scan while the application is launched, without providing a user interface.

9. The electronic device of claim 1, wherein the one or more instructions further cause the electronic device to:
determine that information about the biometric authentication is discarded based on a predetermined time elapsing after the launching of the application is completed, and
wherein the predetermined time corresponds to an average execution time of the application.

10. The electronic device of claim 1, wherein the one or more instructions further cause the electronic device to:
determine that information about the biometric authentication is discarded, based on the at least one processor switching to another application more than a predetermined number of times after the launching of the application is completed, or based on the electronic device entering a locked state.

11. A method for providing a biometric authentication function in an electronic device including a biometric sensor, the method comprising:
receiving an input for executing an application included in the electronic device;
based on receiving the input for executing the application, beginning a launching the application by loading public content corresponding to the application, and determining whether the application is registered with an authentication manager program;
based on identifying that the application is registered with the authentication manager program, operating the biometric sensor of the electronic device to perform a biometric authentication while the public content of the application is loaded; and
based on the biometric sensor completing the biometric authentication, completing the launching of the application by loading the public content and dedicated content associated with the biometric authentication.

12. The method of claim 11, further comprising:
based on the biometric sensor completing the biometric authentication, storing information about the biometric authentication in a memory of the electronic device; and
based on receiving a user input for executing an operation requiring authentication while the application is running, identifying whether to reuse the information about the biometric authentication.

13. The method of claim 12, further comprising:
based on identifying that the reuse of the information about the biometric authentication is allowed, completing the authentication of the operation without a user input for authentication input.

14. The method of claim 11, wherein information about the biometric authentication comprises information about whether reuse of the information about the biometric authentication is allowed.

15. The method of claim 14, further comprising:
identifying whether the reuse of the information about the biometric authentication is allowed, based on at least one of a type of the completed biometric authentication, a type of the application, a type of data used in the application, and a frequency at which authentication is performed while the application is running.

16. An electronic device comprising:
a biometric sensor;
at least one processor; and
memory configured to store one or more instructions which, which executed by the at least one processor, cause the electronic device to:
- based on receiving a first input for selecting a specified application to be executed among a plurality of applications stored in the electronic device, load data associated with the specified application;
- perform, while the data is loaded, a first biometric authentication using first biometric information obtained through the biometric sensor of the electronic device;
- display a content associated with the specified application after the loading of the data is completed;
- in response to receiving, while the content is displayed, a second input for executing a function requiring a biometric authentication among a plurality of functions of the specified application, determine whether the second input is received within a first predetermined time after the first biometric authentication is performed;
- in response to determining that the second input is received within the first predetermined time, execute the function excluding a second biometric authentication, and
- in response to determining that the second input is received after the first predetermined time, execute the function based on the second biometric authentication performed using second biometric information obtained through the biometric sensor,
wherein the first predetermined time is determined based on at least one of a security level associated with the first biometric authentication and a security level associated with the specified application.

17. The electronic device of claim 16, wherein the one or more instructions further cause the electronic device to:
- in response to displaying the content associated with the specified application after the loading of the data is completed, store an authentication result associated with the first biometric authentication in the electronic device;
- in response to receiving the second input for executing the function requiring the biometric authentication, determine whether the authentication result corresponds to an authentication success; and
- in response to determining that the authentication result corresponds to an authentication failure, execute the function based on the second biometric authentication performed using the second biometric information obtained through the biometric sensor.

18. The electronic device of claim 17, wherein the one or more instructions further cause the electronic device to:
- in response to determining that the authentication result is corresponded to the authentication success, execute the function excluding the second biometric authentication.

* * * * *